(12) United States Patent
Van Esbroeck et al.

(10) Patent No.: US 10,264,800 B2
(45) Date of Patent: Apr. 23, 2019

(54) SYSTEM FOR SEPARATING BREAST MEAT FROM AT LEAST A PART OF A KEEL BONE OF A CARCASS PART OF SLAUGHTERED POULTRY

(71) Applicant: MAREL STORK POULTRY PROCESSING B.V., Boxmeer (NL)

(72) Inventors: Maurice Eduardus Theodorus Van Esbroeck, Bemmel (NL); Roger Pierre Hubertus Maria Claessens, Nijmegen (NL); Johannis Anthonie Vroegop, Nijmegen (NL); Gerardus Johannes Catharina Van Bussel, Neerkant (NL)

(73) Assignee: MAREL STORK PULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 16/082,872

(22) PCT Filed: Mar. 22, 2017

(86) PCT No.: PCT/NL2017/050178
§ 371 (c)(1),
(2) Date: Sep. 6, 2018

(87) PCT Pub. No.: WO2017/164734
PCT Pub. Date: Sep. 28, 2017

(65) Prior Publication Data
US 2019/0021348 A1    Jan. 24, 2019

(30) Foreign Application Priority Data

Mar. 23, 2016  (NL) ..................................... 2016478

(51) Int. Cl.
*A22C 21/00*    (2006.01)

(52) U.S. Cl.
CPC ........ *A22C 21/003* (2013.01); *A22C 21/0069* (2013.01)

(58) Field of Classification Search
CPC .......... A22C 21/00; A22C 25/14; A22C 25/16
(Continued)

(56) References Cited

U.S. PATENT DOCUMENTS

| 4,084,294 A * | 4/1978 | Dohrendorf ........... A22C 25/08 |
| | | 452/135 |
| 4,688,297 A | 8/1987 | Bartels |

(Continued)

FOREIGN PATENT DOCUMENTS

| EP | 0 440 032 A1 | 8/1991 |
| EP | 1 498 036 A1 | 1/2005 |

(Continued)

OTHER PUBLICATIONS

International Search Report for PCT/NL2017/050178 dated May 4, 2017.

(Continued)

*Primary Examiner* — Richard T Price, Jr.
(74) *Attorney, Agent, or Firm* — Birch, Stewart, Kolasch & Birch, LLP

(57) ABSTRACT

A system and method for separating breast meat from at least a part of a keel bone of a carcass part of slaughtered poultry includes a product carrier and a pair of breast meat cutter blades adapted to make an incision along the keel bone in the longitudinal direction of the keel bone. The breast meat cutter blades are moveable relative to each other between and open position and a closed position. The system further includes a blade actuator, which comprises a closing assembly to apply a biasing force to the breast meat cutter blades to bias the breast meat cutter blades towards the closed position, and an opening assembly to apply an opening force (Continued)

to the breast meat cutter blades to hold the breast meat cutter blades in the open position.

20 Claims, 9 Drawing Sheets

(58) Field of Classification Search
USPC ................ 452/135, 136, 149–153, 155, 156, 452/160–162
See application file for complete search history.

(56) References Cited

U.S. PATENT DOCUMENTS

| | | | | |
|---|---|---|---|---|
| 5,299,974 A * | 4/1994 | Jahnke | ................... | A22C 25/16 |
| | | | | 452/106 |
| 7,927,194 B2 * | 4/2011 | Jurs | ........................ | A22C 25/16 |
| | | | | 452/135 |
| 8,298,050 B2 * | 10/2012 | Jurs | ........................ | A22C 25/16 |
| | | | | 452/162 |
| 8,956,205 B2 * | 2/2015 | Kowalski | ............... | A22C 25/16 |
| | | | | 452/135 |

FOREIGN PATENT DOCUMENTS

| | | |
|---|---|---|
| EP | 2 258 204 A2 | 12/2010 |
| EP | 2 332 420 A2 | 6/2011 |

OTHER PUBLICATIONS

Search Report for NL 2016478 dated Jun. 11, 2016.
Written Opinion of the International Searching Authority for PCT/NL2017/050178 dated May 4, 2017.

* cited by examiner

SYSTEM FOR SEPARATING BREAST MEAT FROM AT LEAST A PART OF A KEEL BONE OF A CARCASS PART OF SLAUGHTERED POULTRY

BACKGROUND

The invention pertains to a system for separating breast meat from at least a part of a keel bone of a carcass part of slaughtered poultry.

In a carcass of slaughtered poultry, breast meat is naturally present in the form of a breast fillet comprising a right half fillet (formed by the right M. Pectoralis) and a left half fillet (formed by the left. M. Pectoralis). The breast meat can be harvested in such a way that the right half fillet and the left half fillet remain connected to each other. EP2258204 discloses a filleting method and device which allow to harvest breast meat in such a way that the right half fillet and the left half fillet remain connected to each other.

In alternative filleting methods and devices, the right half fillet and the left half fillet are separated from each other before they are removed from the carcass or carcass part. Such a method and device are for example disclosed in EP2332420.

Filleting methods in which the right half fillet and the left half fillet are separated from each other before they are removed from the carcass or carcass part often comprise the step of making an incision along the keel bone, in longitudinal direction thereof. This incision separates the right half fillet and left half fillet from each other, and also one of the right half fillet or left half fillet from at least a part of the keel bone. Often, two of such incisions are made, one of the left side and one of the right side of the keel bone. This way, both the right half fillet and left half fillet are separated from at least a part of the keel bone. The extend as to which the half fillet or half fillets are separated from the keel bone depends on the depth of the incision or incisions. Generally, the incision is made with a rotatable circular knife which forms part of an automated processing device. In case two incisions are made, they are generally made by two rotatable circular knives that are arranged adjacent to each other, for example on a single shaft with a spacer being arranged between them.

The incision along the keel bone is preferably made close to the keel bone, as this results in a optimal yield because little meat remains behind on the keel bone. This is however not so easily achieved, because the thickness of the keel bone varies in longitudinal direction of the keel bone and also the width of the keel bone shows a natural variation. The width of the keel bone varies with the weight class of poultry carcasses and with the breeds. In addition, utmost care should be taken not to cut into the keel bone, because this would lead to bone fragments in the breast meat, which is not acceptable.

It is known to adjust the distance between two rotatable circular knives that are arranged adjacent to each other to make the two incisions along the keel bone by replacing a washer ring that is present between the two circular knives with a washer ring of a different longitudinal dimension. Such an adjustment requires the use of tools, and is complicated as well as time consuming.

The invention aims to provide an improved system for separating breast meat from at least a part of a keel bone of a carcass part of slaughtered poultry.

SUMMARY

According to the invention, this object is achieved with a system for separating breast meat from at least a part of a keel bone of a carcass part of slaughtered poultry, which carcass part comprises:
a keel bone, which has a longitudinal direction and a first flank and a second flank which both extend generally in the longitudinal direction of the keel bone,
breast meat which is located against the first flank of the keel bone, and breast meat which is located against the second flank of the keel bone,
which system comprises:
a product carrier for supporting the carcass part, which product carrier is moveable in a transport direction along a conveying path,
a pair of breast meat cutter blades comprising a first breast meat cutter blade and a second breast meat cutter blade (40), wherein the first breast meat cutter blade is adapted to separate the breast meat from at least a part of the first flank of the keel bone by making an incision along the keel bone in the longitudinal direction of the keel bone, and wherein the second breast meat cutter blade (40) is adapted to separate the breast meat from at least a part of the second flank of the keel bone by making an incision along the keel bone in the longitudinal direction of the keel bone,
the product carrier being moveable in the direction of transport relative to the breast meat cutter blades, and
wherein the first and second breast meat cutter blades are moveable relative to each other between and open position and a closed position, wherein the distance between the first and second breast meat cutter blades in a direction perpendicular to the conveying path of the product carrier in the open position is larger than in the closed position, and wherein the breast meat cutter blades are biased towards the closed position,
a blade actuator, which comprises a closing assembly which is adapted to apply a biasing force to the first and second breast meat cutter blade to bias the first and second breast meat cutter blade towards the closed position, and an opening assembly which is adapted to apply an opening force to the first and second breast meat cutter blade to hold the first and second breast meat cutter blade in the open position.

The carcass part which is to be processed by the system according to the invention generally comprises a keel bone and breast meat. The keel bone has a longitudinal direction and a first flank which extends generally in the longitudinal direction of the keel bone. Breast meat is located against the first flank of the keel bone.

The keel bone further has a second flank, which flank also extends generally in the longitudinal direction of the keel bone. The carcass part in addition comprises breast meat that is located against the second flank of the keel bone.

In a special embodiment of the invention, it is not required that breast meat is present which is located against the second flank of the keel bone.

Carcass parts that can be processed in the system in accordance with the invention include for example front halves and breast caps.

The system according to the invention comprises a product carrier for supporting the carcass part. The product carrier is moveable in a transport direction along a conveying path. The product carrier can for example be a product carrier that is adapted to support a front half or a product carrier that is adapted to support a breast cap. The product carrier can be conveyed along its conveying part for example by an overhead conveyor or an endless chain conveyor that runs in a vertical plane.

The system according to the invention further comprises a pair of breast meat cutter blades comprising a first breast meat cutter blade and a second breast meat cutter blade. The first breast meat cutter blade is adapted to separate the breast meat from at least a part of the first flank of the keel bone. This is done by making an incision along the keel bone in the longitudinal direction of the keel bone. The depth of the incision determines to which extent the breast meat is separated from the keel bone.

The second breast meat cutter blade is adapted to separate the breast meat from at least a part of the second flank of the keel bone. This is done by making an incision along the keel bone in the longitudinal direction of the keel bone. The depth of the incision determines to which extent the breast meat is separated from the keel bone.

Preferably, the first breast meat cutter blade and the second breast meat cutter blade are arranged on opposite sides of the conveying path of the product carrier.

The product carrier is moveable in the direction of transport relative to the first breast meat cutter blade. The breast meat cutter blades are optionally arranged in such a way that they cannot move in or opposite to the transport direction of the product carrier. Alternatively, the breast meat cutter blades can be arranged in such a way that they can move in and/or opposite to the transport direction of the product carrier.

In the system according to the invention, the first and second breast meat cutter blades are moveable relative to each other between and open position and a closed position. The distance between the first and second breast meat cutter blades in a direction perpendicular to the conveying path of the product carrier in the open position is larger than in the closed position. The breast meat cutter blades are biased towards the closed position.

The system according to the invention further comprises a blade actuator, which comprises a closing assembly and an opening assembly. The closing assembly is adapted to apply a biasing force to the first and second breast meat cutter blade to bias the first and second breast meat cutter blade towards the closed position. The opening assembly is adapted to apply an opening force to the first and second breast meat cutter blade to hold the first and second breast meat cutter blades in the open position. So, the opening assembly actively holds the first and second breast meat cutter blades in the open position by applying the opening force.

There are many ways in which the first and second breast meat cutter blades can be actively held in the open position. For example, a force can be continuously applied to counteract the biasing force, or the opening assembly may comprise a lock which holds the first and second breast meat cutter blades in the open position.

Optionally, the blade actuator acts on the first and second breast meat cutter blade simultaneously.

Optionally, the opening assembly of the blade actuator comprises a first part and a second part. The first part of the opening assembly of the blade actuator is adapted to apply an opening force to the first breast meat cutter blade. The second part of the opening assembly is adapted to apply an opening force to the second breast meat cutter blade.

Optionally, the closing assembly of the blade actuator comprises a first part and a second part. The first part of the closing assembly of the blade actuator is adapted to apply a biasing force to the first breast meat cutter blade. The second part of the closing assembly is adapted to apply a biasing force to the second breast meat cutter blade.

In use, initially the first breast meat cutter blade and the second breast meat cutter blade are in the open position.

Optionally, initially both breast meat cutter blades are both arranged at such a distance from the conveying path the product carrier that an empty product carrier can pass by it without collision. Optionally, initially both breast meat cutter blades are both arranged at such a distance from the conveying path the product carrier that a product carrier which carries a product that does not have to be processed by the system according to the invention can pass by it without collision.

In a possible embodiment, the pair of breast meat cutter blades is initially arranged at a distance from the conveying path the product carrier, for example in a direction perpendicular to both the conveying path and direction of the distance between the first and second breast meat cutter blades. When a product carrier approaches, the pair of breast meat cutter blades is then in this embodiment moved towards to the conveying path into a cutting position in which the first and second breast meat cutter blade are able to make the respective incisions along the keel bone.

In accordance with the invention, the opening assembly of the blade actuator applies a opening force on the first and second breast meat cutter blades to keep them in the open position. Optionally, the opening force keeps the first and second breast meat cutter blades in the open position against the biasing force of the closing assembly of the blade actuator.

A product carrier onto which a carcass part is arranged, is moved along the conveying path to the pair of breast meat cutter blades.

Then, while the breast meat cutter blades are in the open position, the product carrier moves the carcass part further along the conveying path and makes that the leading tip of the keel bone passes between the first and the second breast meat cutter blade. The leading tip of the keel bone part from which the breast meat is to be separated is usually the widest or thickest part of this part of the keel bone. The keel bone has a generally tapered shape when looking towards the breast bone of the poultry carcass, with generally the widest part at the leading tip and the narrowest part at the trailing end. The trailing end of the keel bone contains cartilage.

Upon this passing, the first breast meat cutter blade makes a first incision along the leading tip of the keel bone in the longitudinal direction of the keel bone on the side of the first flank of the keel bone. The second breast meat cutter blade makes a second incision along the leading tip of the keel bone in the longitudinal direction of the keel bone on the side of the second flank of the keel bone.

Preferably, in the open position, the distance between the first and second breast meat cutter blades in a direction perpendicular to the conveying path of the product carrier is such that when a carcass part of a size or weight class that can normally expected is present on the product carrier, the leading tip of the keel bone—which often is the widest or thickest part of the keel bone—can pass the first and second breast meat cutter blades without the first and/or the second breast meat cutter blade damaging the keel bone.

The distance between the first and the second breast meat cutter blade in the open position can optionally be chosen to be fixed. The distance is then selected such that the leading tip of the keel bone of any carcass part having a size or weight class that can normally expected can pass between the first and the second breast meat cutter blade without being damaged by these breast meat cutter blades.

Alternatively, the distance between the first and the second breast meat cutter blade in the open position can be chosen to be variable or adjustable. For example, this distance can be selected from a number of predetermined values that each correspond to a certain weight class, or can be selected dependent from the average size or weight of the flock that is to be processed, either from a continuous range or from a limited number of predetermined values.

When the leading tip of the keel bone has passed the pair of breast meat cutter blades, the first and second breast meat cutter blades are released from the open position. In the context of the current invention, the leading tip of the keel bone is deemed to have passed the breast meat cutter blades when the overlap between the flanks of the keel bone and the breast meat cutter blades is large enough for the breast meat cutter blades to be guided along the flanks of the keel bone. So, the overlap has to be large enough to prevent that one or both of the breast meat cutter blades slides away from the keel bone and arrives in a position in front of or above the keel bone due to the biasing force. This reduces the risk that the cutting edge of a breast meat cutter blade comes into contact with the keel bone, and therewith reduces the risk of bone fragments in the breast meat.

The release from the open position takes place after a part of the first and second incision has been made.

When the first and second breast meat cutter blades are released from the open position, the first and second breast meat cutter blade are allowed to move towards the closed position by applying a biasing force on the first and second breast meat cutter blade. Releasing the first and second breast meat cutter blades from the open position and allowing them to move towards the closed position can for example be done by removing the opening force that is applied by the opening assembly and applying the biasing force by the closing assembly, or by increasing the biasing force that is applied by the closing assembly to a level that exceeds the opening force that is applied by the opening assembly.

The product carrier moves the carcass part further along the conveying path such that the keel bone is moved between the first and second breast meat cutter blades. Thereby, the first incision along the first flank of the keel bone is extended towards the trailing tip of the keel bone and the second incision along the second flank of the keel bone is extended towards the trailing tip of the keel bone.

The biasing force forces the first breast meat cutter blade towards or even against the first flank of the keel bone. Likewise, the biasing force forces the second breast meat cutter blade towards or even against the second flank of the keel bone. This way, the first incision and the second incision follow, or at least generally follow, the shape of the keel bone. This results in an increased yield as compared to known methods and devices, because relatively little meat will remain behind on the keel bone in the area in which the incisions were made.

The biasing force biases the first and second breast meat cutter blade towards the closed position, but it is not necessary that the first and second breast meat cutter blades reach the closed position entirely. If the narrowest portion of the keel bone is wider than the distance between the first and second breast meat cutter blades, the first and second breast meat cutter blade do not reach the closed position. Nevertheless, the biasing force is still directed towards the closed position.

The use of an opening assembly that actively holds the first and second breast meat cutter blades in the open position before releasing them from this open position and pressing them towards the flanks of the keel bone by a biasing force has the advantage that the risk of having bone fragments in the beast meat is reduced, but that still a good yield can be obtained. The risk of bone fragments in the meat is reduced because the risk of collision between one or both breast meat cutter blades and the wide part of the keel bone is very low when the first and second breast meat cutter blades are in the open position.

Actively holding the first and second breast meat cutter blades in the open position and then releasing them under a biasing force which is directed towards the closed position has the advantage that also carcass parts which are not arranged on the product carrier in an entirely correct way (e.g. not correctly centered) or which have an odd shape are processed correctly.

In a possible embodiment, the biasing force is adjustable and/or controllable.

In a possible embodiment, the distance between the first and the second breast meat cutter blade in the open position is adjustable.

In a possible embodiment, the distance between the first and the second breast meat cutter blade in the closed position is adjustable.

In a possible embodiment, the distance between the first and the second breast meat cutter blades measured in a direction perpendicular to the conveying path is more than zero. So, in this embodiment, even when the first and second breast meat cutter blades would reach the closed position entirely, they do not touch each other.

The first and second breast meat cutter blades have a cutting edge which is arranged such that it preferably, during normal use of the system according to the invention, does not engage the keel bone when the first and/or second breast meat cutter blade, respectively, is pressed against the keel bone by the biasing force of the closing assembly.

In a possible embodiment, the opening assembly is adapted to apply the opening force to act against the biasing force of the closing assembly. In this embodiment, the biasing force is always present. The opening assembly holds the first and second breast meat cutter blades in the open position by applying an opening force that works in a direction opposite to the biasing force, and that is larger than the biasing force.

In a possible embodiment, the system further comprises a blade support onto which the first breast meat cutter blade and/or the second breast meat cutter blade is mounted. In this embodiment, at least a part of the blade actuator is arranged in the blade support. For example, the blade support may accommodate one or more springs or one or more pistons for providing a biasing force or an opening force to one or both of the breast meat cutter blades.

This embodiment provides a robust and elegant construction, which is easy to clean. The outer surface of the support can be smooth, without the mounting thereon of numerous separate parts, for example a cylinder and the controls therefor, being necessary. This way, contamination of the device is prevented and the moveable parts are shielded from external influences.

Optionally, the system according to the invention comprises a first blade support onto which the first breast meat cutter blade is mounted and a second blade support onto which the second breast meat cutter blade is mounted. Optionally, at least a part of the blade actuator is present in the first blade support, for example a part of the blade actuator which is adapted to provide an opening force or biasing force to the first breast meat cutter blade. In addition, optionally at least a further part of the blade actuator is present in the second blade support, for example a part of the blade actuator which is adapted to provide an opening force or biasing force to the second breast meat cutter blade.

In a possible embodiment, the first breast meat cutter blade and the second breast meat cutter blades are rotatable circular blades. In this embodiment, the system further comprises a blade drive which is adapted to rotate the first breast meat cutter blade and the second breast meat cutter blade. The blade drive may comprise a first blade drive device, which is adapted to rotate the first breast meat cutter blade and a second blade drive device, which is adapted to rotate the second breast meat cutter blade.

In this embodiment, optionally the first breast meat cutter blade is arranged onto the blade support, which contains at least a part of the blade actuator. The blade support is in this embodiment for example arranged between the first breast meat cutter blade and the blade drive.

Alternatively, in this embodiment, the second breast meat cutter blade is optionally arranged onto the blade support, which contains at least a part of the blade actuator. The blade support is in this embodiment for example arranged between the second breast meat cutter blade and the blade drive.

In a further variant of this embodiment, the blade drive comprises a first blade drive device and a second blade drive device. The first blade drive device is adapted to rotate the first breast meat cutter blade and the second blade drive device is adapted to rotate the second breast meat cutter blade. In addition, in this variant a first blade support is present onto which the first breast meat cutter blade is mounted as well as a second blade support onto which the second breast meat cutter blade is mounted. The first blade support is arranged between the first blade drive device and the first breast meat cutter blade and the second blade support is present between the second blade drive and the second breast meat cutter blade. Optionally, at least a part of the blade actuator is present in the first and/or second blade support.

A rotatable circular blade is suitable to make the longitudinal incision along the keel bone.

By arranging at least a part of the blade actuator in the blade support or one of the blade supports, the biasing force and the opening force can be applied to the first and/or second breast meat cutter blade, respectively, from a location close to the respective breast meat cutter blade or breast meat cutter blades. This is advantageous because in this way, no complicated transmission of these forces is required.

In a possible embodiment, the first breast meat cutter blade and the second breast meat cutter blade are static blades. In this embodiment, the system further comprises a frame.

The breast meat cutter blades are static in the sense that there is no motion of the blades for executing the cutting action. The static blades are moveable from the open position towards the closed position and vice versa.

In this embodiment, optionally the first breast meat cutter blade is arranged onto the blade support, which contains at least a part of the blade actuator. The blade support is in this embodiment for example arranged between the first breast meat cutter blade and the frame.

Alternatively, in this embodiment, the second breast meat cutter blade is optionally arranged onto the blade support, which contains at least a part of the blade actuator. The blade support is in this embodiment for example arranged between the second breast meat cutter blade and the frame.

In a further variant of this embodiment, a first blade support is present onto which the first breast meat cutter blade is mounted as well as a second blade support onto which the second breast meat cutter blade is mounted. The first blade support is arranged between the frame and the first breast meat cutter blade and the second blade support is present between frame and the second breast meat cutter blade. Optionally, at least a part of the blade actuator is present in the first and/or second blade support.

By arranging at least a part of the blade actuator in the blade support or one of the blade supports, the biasing force and the opening force can be applied to the first and/or second breast meat cutter blade, respectively, from a location close to the respective breast meat cutter blade or breast meat cutter blades. This is advantageous because in this way, no complicated transmission of these forces is required.

In a possible embodiment, the first breast meat cutter blade and the second breast meat cutter blades are oscillating blades. In this embodiment, the system further comprises a blade drive which is adapted to oscillate the first breast meat cutter blade and the second breast meat cutter blade. The blade drive may comprise a first blade drive device, which is adapted to oscillate the first breast meat cutter blade and a second blade drive device, which is adapted to oscillate the second breast meat cutter blade.

In this embodiment, optionally the first breast meat cutter blade is arranged onto the blade support, which contains at least a part of the blade actuator. The blade support is in this embodiment for example arranged between the first breast meat cutter blade and the blade drive.

Alternatively, in this embodiment, the second breast meat cutter blade is optionally arranged onto the blade support, which contains at least a part of the blade actuator. The blade support is in this embodiment for example arranged between the second breast meat cutter blade and the blade drive.

In a further variant of this embodiment, the blade drive comprises a first blade drive device and a second blade drive device. The first blade drive device is adapted to oscillate the first breast meat cutter blade and the second blade drive device is adapted to oscillate the second breast meat cutter blade. In addition, in this variant a first blade support is present onto which the first breast meat cutter blade is mounted as well as a second blade support onto which the second breast meat cutter blade is mounted. The first blade support is arranged between the first blade drive device and the first breast meat cutter blade and the second blade support is present between the second blade drive and the second breast meat cutter blade. Optionally, at least a part of the blade actuator is present in the first and/or second blade support.

In a possible embodiment, the opening assembly of the blade actuator comprises a piston which is actuatable by a fluid medium. The fluid medium is for example a gas, e.g. air, or a liquid. In this embodiment, closing assembly of the blade actuator comprises a spring.

In this embodiment, the biasing force acting on the breast meat cutter blades can be accurately controlled and/or adapted.

In a possible embodiment, the opening assembly of the blade actuator comprises a spring. In this embodiment, the closing assembly of the blade actuator comprises a piston which is actuatable by a fluid medium, which fluid medium is for example a gas, e.g. air, or a liquid.

In a possible embodiment, both the opening assembly and the closing assembly of the blade actuator comprise a piston which is actuatable by a fluid medium. The fluid medium is for example a gas, e.g. air or a liquid.

In a possible embodiment, the second breast meat cutter blade has the same features as or similar features (e.g. mirrored) to the first breast meat cutter blade.

In a possible embodiment, the first breast meat cutter blade and the second breast meat cutter blade are arranged adjacent to each other on opposite sides of the conveying path of the product carrier.

In a possible embodiment, the first breast meat cutter blade and the second breast meat cutter blade are both circular blades. The first breast meat cutter blade and the second breast meat cutter blade are arranged coaxially with each other. Optionally, the first breast meat cutter blade and the second breast meat cutter blade are arranged on the same shaft.

In a possible embodiment the first breast meat cutter blade and the second breast meat cutter blade are arranged adjacent to each other on opposite sides of the conveying path of the product carrier, the first breast meat cutter blade and the second breast meat cutter blade are both circular blades and the first breast meat cutter blade and the second breast meat cutter blade are arranged coaxially with each other. Optionally, the first breast meat cutter blade and the second breast meat cutter blade are arranged on the same shaft.

In a possible embodiment, the system comprises a first blade support onto which the first breast meat cutter blade is mounted and a second blade support onto which the second breast meat cutter blade is mounted.

In this embodiment the first blade support comprises a first part of the opening assembly and a first part of the closing assembly. The first part of the opening assembly is adapted to apply an opening force to the first breast meat cutter blade. The first part of the closing assembly is adapted to apply an biasing force to the first breast meat cutter blade. The second blade support comprises a second part of the opening assembly and a second part of the closing assembly. The second part of the opening assembly is adapted to apply an opening force to the second breast meat cutter blade. The second part of the closing assembly is adapted to apply an biasing force to the second breast meat cutter blade.

Optionally, in this embodiment, the second breast meat cutter blade has a shape that is a mirror image of the shape of the first breast meat cutter blade.

Optionally, the second blade support is designed as a mirror image of the first blade support.

Optionally, the second part of the opening assembly is designed as a mirror image of the first part of the opening assembly.

Optionally, the second part of the closing assembly is designed as a mirror image of the first part of the closing assembly.

In a possible embodiment, the first breast meat cutter blade and the second breast meat cutter blade are both arranged along the conveying path of the product carrier, and the second breast meat cutter blade is arranged downstream of the first breast meat cutter blade as seen in the transport direction of the product carrier.

In this embodiment, optionally first the first incision, along the first flank of the keel bone, is started to be made, and then the second incision, along the second flank of the keel bone, is started to be made. Optionally, the first incision is finished before the second incision is started.

In a variant of this embodiment, the opening assembly of the blade actuator comprises a first part which is adapted to apply an opening force to the first breast meat cutter blade and a second part which is adapted to apply an opening force to the second breast meat cutter blade. Likewise, in this variant, the closing assembly of the blade actuator comprises a first part which is adapted to apply an biasing force to the first breast meat cutter blade and a second part which is adapted to apply an biasing force to the second breast meat cutter blade. Optionally, the blade actuator is adapted to operate the first part of the opening assembly and the second part of the opening assembly independently from each other, and/or the blade actuator is adapted to operate the first part of the closing assembly and the second part of the closing assembly independently from each other.

In a possible embodiment, the first breast meat cutter blade and/or the second breast meat cutter blade are provided with a first facet on the side facing towards the conveying path of the carrier (and therewith in use towards the keel bone) and a second facet on the side facing away from the conveying path of the carrier (and therewith in use away from the keel bone). Optionally, the first facet is smaller than the second facet.

This design of the first breast meat cutter blade and/or the second breast meat cutter blade reduces the risk of cutting into the keel bone by these blades, and therewith reduces the risk of having bone fragments in the breast meat.

The invention further pertains to a method for separating breast meat from at least a part of a keel bone of a carcass part of slaughtered poultry wherein the system according to the invention is used.

The invention further pertains to a method for separating breast meat from at least a part of a keel bone of a carcass part of slaughtered poultry which comprises the following steps:

arranging a carcass part on a product carrier, which product carrier is moveable in a transport direction along a conveying path, and which carcass part comprises a keel bone, which has a longitudinal direction and a first flank and second flank which both extend generally in the longitudinal direction of the keel bone, and breast meat which is located against the first flank of the keel bone, and breast meat which is located against the second flank of the keel bone, holding a first breast meat cutter blade and a second breast meat cutter blade in an open position relative to each other by applying an opening force to the first and second breast meat cutter blade, wherein in the open position the distance between the first breast meat cutter blade and the second breast meat cutter blade in a direction perpendicular to the conveying path allows the leading tip of the keel bone to pass between the first and second breast meat cutter blade, moving the product carrier along the conveying path and making the leading tip of the keel bone pass between the first and second breast meat cutter blade, thereby making a first incision along the leading tip of the keel bone in the longitudinal direction of the keel bone on the side of the first flank of the keel bone and a second incision along the leading tip of the keel bone in the longitudinal direction of the keel bone on the side of the second flank of the keel bone, releasing the first and second breast meat cutter blade from the open position, and allowing the first and second breast meat cutter blade to move towards the closed position by applying a biasing force on the first and second breast meat cutter blade and moving the product carrier further along the conveying path such that the keel bone is moved between the first and second breast meat cutter blades, thereby extending the first incision along the first flank of the keel bone towards the trailing tip of the keel bone and extending the second incision along the second flank of the keel bone towards the trailing tip of the keel bone.

This method is optionally carried out using the system according to the invention.

In a possible embodiment, the method in accordance with the invention is carried out after the wishbone has been removed from the carcass part.

In a possible embodiment, the system according to the invention further comprises a wishbone remover, which wishbone remover is arranged upstream of the pair of breast meat cutter blades.

In a possible embodiment, method further comprises the following steps:
- after the trailing tip of the keel bone has been moved past the first and second breast meat cutter blades, applying the opening force to the first and second breast meat cutter blades to move the first and second breast meat cutter blades into the open position,
- continuing to apply the opening force to maintain the first and second breast meat cutter blades in the open position.

In this embodiment, the system used to carry out the method is made ready for processing the next carcass part right after a carcass part has being processed.

In a possible embodiment, the opening force and the biasing force are applied simultaneously, and the opening force is larger than the biasing force when the first and second breast meat cutter blades are moved to the open position. The biasing force is larger than the opening force when the first and second breast meat cutter blades are released from the open position.

The invention further pertains to a method for separating breast meat from at least a part of a keel bone of a carcass part of slaughtered poultry which is in particular suitable for use in combination with the embodiment of the system according to the invention in which the second breast meat cutter blade is arranged downstream of the first breast meat cutter blade along the conveying path of the product carrier.

This method comprises the following steps:
- arranging a carcass part on a product carrier, which product carrier is moveable in a transport direction along a conveying path, and which carcass part comprises a keel bone, which has a longitudinal direction and a first flank and second flank which both extend generally in the longitudinal direction of the keel bone, and breast meat which is located against the first flank of the keel bone, and breast meat which is located against the second flank of the keel bone,
- holding a first breast meat cutter blade in an open position relative to the conveying path by applying an opening force to the first breast meat cutter blade, wherein in the open position the distance between the first breast meat cutter blade and the conveying path allows the leading tip of the keel bone to pass the first breast meat cutter blade,
- moving the product carrier along the conveying path and making the leading tip of the keel bone pass the first breast meat cutter blade, thereby making a first incision along the leading tip of the keel bone in the longitudinal direction of the keel bone on the side of the first flank of the keel bone,
- releasing the first breast meat cutter blade from the open position, and allowing the first breast meat cutter blade to move towards the closed position by applying a biasing force on the first breast meat cutter blade and moving the product carrier further along the conveying path such that the keel bone is moved past the first breast meat cutter blade, thereby extending the first incision along the first flank of the keel bone towards the trailing tip of the keel bone,
- holding a second breast meat cutter blade in an open position relative to the conveying path by applying an opening force to the second breast meat cutter blade, wherein in the open position the distance between the second breast meat cutter blade and the conveying path allows the leading tip of the keel bone to pass the second breast meat cutter blade,
- moving the product carrier along the conveying path and making the leading tip of the keel bone pass the second breast meat cutter blade, thereby making a second incision along the leading tip of the keel bone in the longitudinal direction of the keel bone on the side of the second flank of the keel bone,
- releasing the second breast meat cutter blade from the open position, and allowing the second breast meat cutter blade to move towards the closed position by applying a biasing force on the second breast meat cutter blade and moving the product carrier further along the conveying path such that the keel bone is moved past the second breast meat cutter blade, thereby extending the second incision along the second flank of the keel bone towards the trailing tip of the keel bone.

In a further variant of the invention, the system does not contain a pair of breast meat cutter blades, but just a single moveable breast meat cutter blade.

In this variant, the invention pertain to a the system for separating breast meat from at least a part of a keel bone of a carcass part of slaughtered poultry,
which carcass part comprises:
- a keel bone, which has a longitudinal direction and a first flank which extends generally in the longitudinal direction of the keel bone,
- breast meat which is located against the first flank of the keel bone, which system comprises:
- a product carrier for supporting the carcass part, which product carrier is moveable in a transport direction along a conveying path,
- a first breast meat cutter blade, wherein the first breast meat cutter blade is adapted to separate the breast meat from at least a part of the first flank of the keel bone by making an incision along the keel bone in the longitudinal direction of the keel bone, and wherein the product carrier being moveable in the direction of transport relative to the breast meat cutter blades, and wherein the first breast meat cutter blade is moveable relative to the conveying path between and open position and a closed position, wherein the distance from the first breast meat cutter blade to the conveying path in a direction perpendicular to the conveying path in the open position is larger than in the closed position, and wherein the first breast meat cutter blade is biased towards the closed position,
- a blade actuator, which comprises a closing assembly which is adapted to apply a biasing force to the first breast meat cutter blade to bias the first breast meat cutter blade towards the closed position, and
- an opening assembly which is adapted to apply an opening force to the first breast meat cutter blade to hold the first breast meat cutter blade in the open position.

In a possible embodiment, this variant further comprises a second breast meat cutter blade which second breast meat cutter blade is adapted to separate the breast meat from at least a part of the second flank of the keel bone by making an incision along the keel bone in the longitudinal direction of the keel bone. In this embodiment, the second breast meat cutter blade is fixed relative to the conveying path at least when the second incision is being made.

In a further variant, the invention pertains to a method for separating breast meat from at least a part of a keel bone of a carcass part of slaughtered poultry, in which a single moveable breast meat cutter is used.

This method comprises the following steps:
arranging a carcass part on a product carrier, which product carrier is moveable in a transport direction along a conveying path, and which carcass part comprises a keel bone, which has a longitudinal direction and a first flank which extends generally in the longitudinal direction of the keel bone, and breast meat which is located against the first flank of the keel bone,
holding a first breast meat cutter blade in an open position relative to the conveying path by applying an opening force to the first breast meat cutter blade, wherein in the open position the distance between the first breast meat cutter blade and the conveying path allows the leading tip of the keel bone to pass the first breast meat cutter blade,
moving the product carrier along the conveying path and making the leading tip of the keel bone pass the first breast meat cutter blade, thereby making a first incision along the leading tip of the keel bone in the longitudinal direction of the keel bone on the side of the first flank of the keel bone,
releasing the first breast meat cutter blade from the open position, and allowing the first breast meat cutter blade to move towards the closed position by applying a biasing force on the first breast meat cutter blade and moving the product carrier further along the conveying path such that the keel bone is moved past the first breast meat cutter blade, thereby extending the first incision along the first flank of the keel bone towards the trailing tip of the keel bone.

BRIEF DESCRIPTION OF THE FIGURES

The invention will be described in more detail below under reference to the drawing, in which in a non-limiting manner exemplary embodiments of the invention will be shown.

The drawing in.

DETAILED DESCRIPTION

Figure 1:
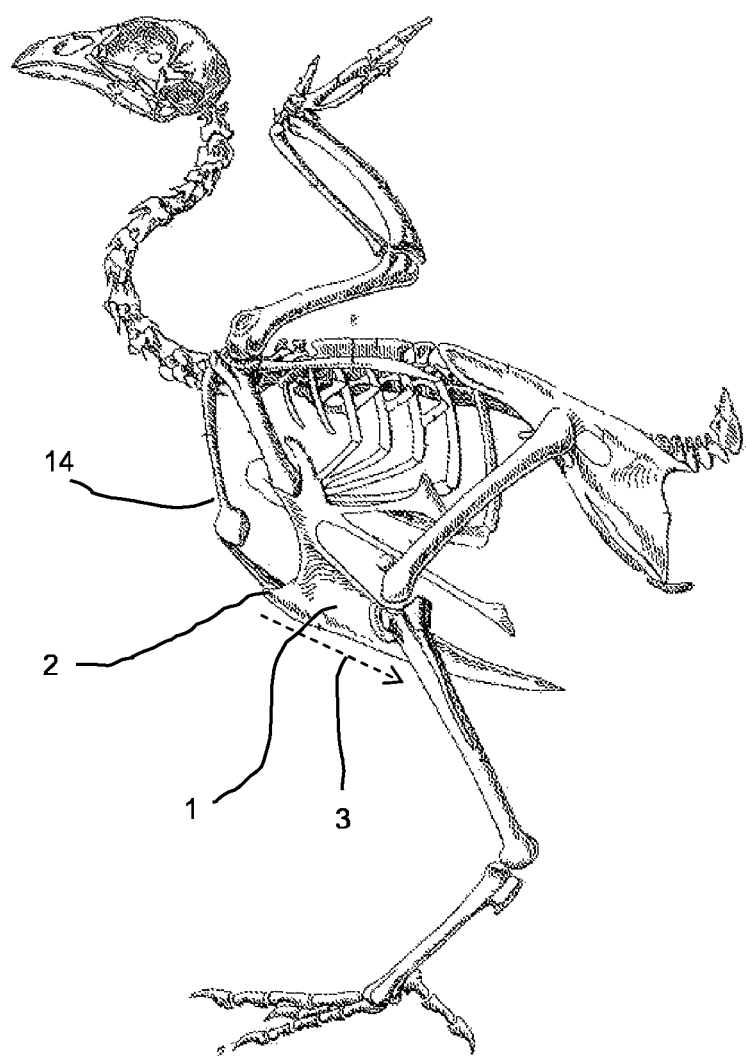
FIG. 1: illustrates schematically the skeleton of a chicken, in side view.

FIG. 1 schematically illustrates the skeleton of a chicken. The skeleton comprises a keel bone 1, which has a leading tip 2. In FIG. 1, reference numeral 3 indicates the longitudinal direction of the keel bone 1. The skeleton as shown in FIG. 1 further comprises wishbone 14. Preferably, the wishbone has been removed from the carcass part before the carcass part arrives at the system according to the invention, and/or before the method according to the invention is carried out.

Figure 2:
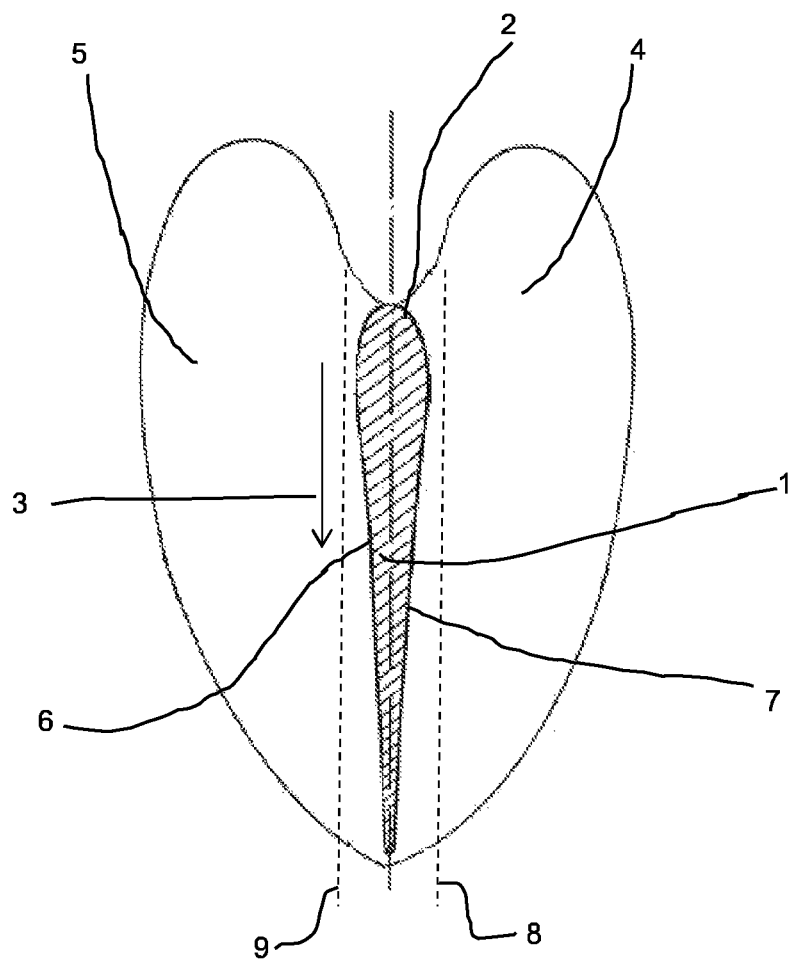
FIG. 2: illustrates a breast piece of slaughtered poultry in a schematic way.

FIG. 2 illustrates a breast piece of slaughtered poultry in a schematic way. A breast piece is an example of a carcass part of slaughtered poultry that can be processed using the system and method of the invention.

The breast piece comprises a keel bone 1, a left half fillet 4 and a right half fillet 5. Initially, the left half fillet 4 and the right half fillet 5 are connected to each other by meat that is present on the keel bone.

FIG. 2 again shows the keel bone 1 with its leading tip 2. As can be seen in FIG. 2, the keel bone 1 has a generally tapered shape. The keel bone 1 has a first flank 6 and a second flank 7. In FIG. 2, the first flank 6 is adjacent to the right half fillet 5 and the second flank 7 is adjacent to the left half fillet 4. This can however also be the other way around.

Dashed lines 8 and 9 indicate the incisions along the keel bone and extending in the longitudinal direction 3 that are used in prior art filleting methods. In these methods, meat that is present between the dashed line 8 and the first flank 6 and meat that is present between the dashed line 9 and the second flank 7 will not be harvested along with the breast half fillets 4, 5 and therewith reduces the overall yield of the filleting process.

Figure 3:
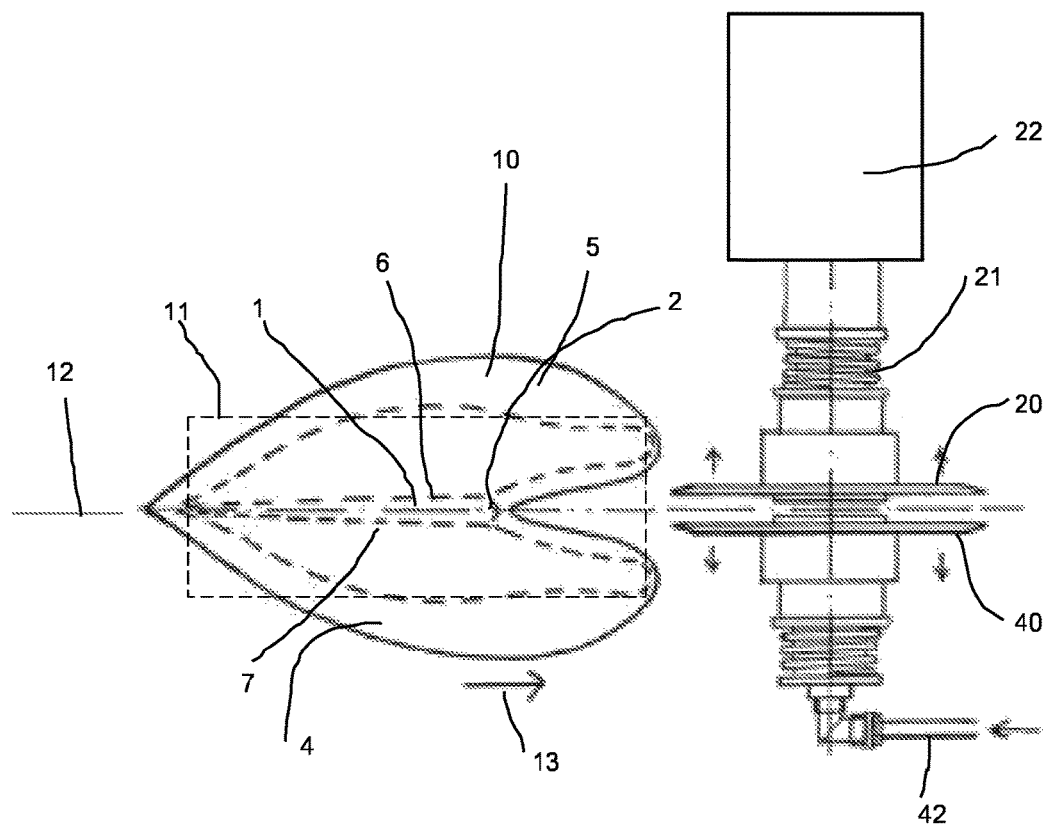
FIG. 3: illustrates schematically a first stage of an embodiment of the method according to the invention, using an embodiment of the system according to the invention, in side view.

FIG. 3 illustrates schematically a first stage of an embodiment of the method according to the invention, using an embodiment of the system according to the invention.

FIG. 3 shows a carcass part 10, which is arranged on product carrier 11. The product carrier 11 is moveable along conveying path 12, in a transport direction 13.

The carcass part 10 is in this example a breast piece, which comprises keel bone 1, and breast meat in the form of right half fillet 5 and left half fillet 4. The left half fillet 4 is located against the second flank 7 of the keel bone 1 and the right half fillet 5 is located against the first flank 6 of the keel bone 1.

The embodiment of the system according to the invention that is (partly) shown in FIG. 3 comprises first breast meat cutter blade 20, which is mounted on blade support 21. The system further comprises a second breast meat cutter 40, which is also mounted on blade support 21. The blade support 21 extends through the first and second breast meat cutter blades 20, 40.

Both the first breast meat cutter blade 20 and the second breast meat cutter blade 40 are rotatable circular blades. A blade drive 22 is provided which is adapted to rotate the first breast meat cutter blade 20 and the second breast meat cutter blade 40.

The blade support 21 is arranged between the first breast meat cutter blade 20 and the blade drive 22. The blade support 21 contains at least a part of the opening assembly and at least a part of the closing assembly of the blade actuator in accordance with the invention.

In the embodiment shown in FIG. 3, the first breast meat cutter blade 20 and the second breast meat cutter blade 40 are arranged adjacent to each other on opposite sides of the conveying path 12 of the product carrier 11. The first breast meat cutter blade 20 and the second breast meat cutter blade 40 are both circular blades, and the first breast meat cutter blade 20 and the second breast meat cutter blade 40 are arranged coaxially with each other. In this particular embodiment, the first breast meat cutter blade 20 and the second breast meat cutter blade 40 are even arranged on the same shaft, so that the blade drive 22 can rotate both the first breast meat cutter blade 20 and the second breast meat cutter blade 40 at the same time.

FIG. 3 shows the first breast meat cutter blade 20 and the second breast meat cutter blade 40 in the open position. The leading tip 2 of the keel bone 1 is able to pass between the first breast meat cutter blade 20 and the second breast meat cutter blade 40 when the first breast meat cutter blade 20 and the second breast meat cutter blade 40 are in the open position. When the first breast meat cutter blade 20 and the second breast meat cutter blade 40 are in the open position, they are relatively far apart.

In accordance with the embodiment of the method according to the invention as shown in FIG. 3, the product carrier with the carcass part 10 moves along the conveying path 12 towards the first breast meat cutter blade 20 and the second breast meat cutter blade 40.

In the embodiment of FIG. 3, an air supply 42 is provided for the actuation of the closing assembly of the of the blade actuator and/or the opening assembly of the blade actuator.

Figure 4:
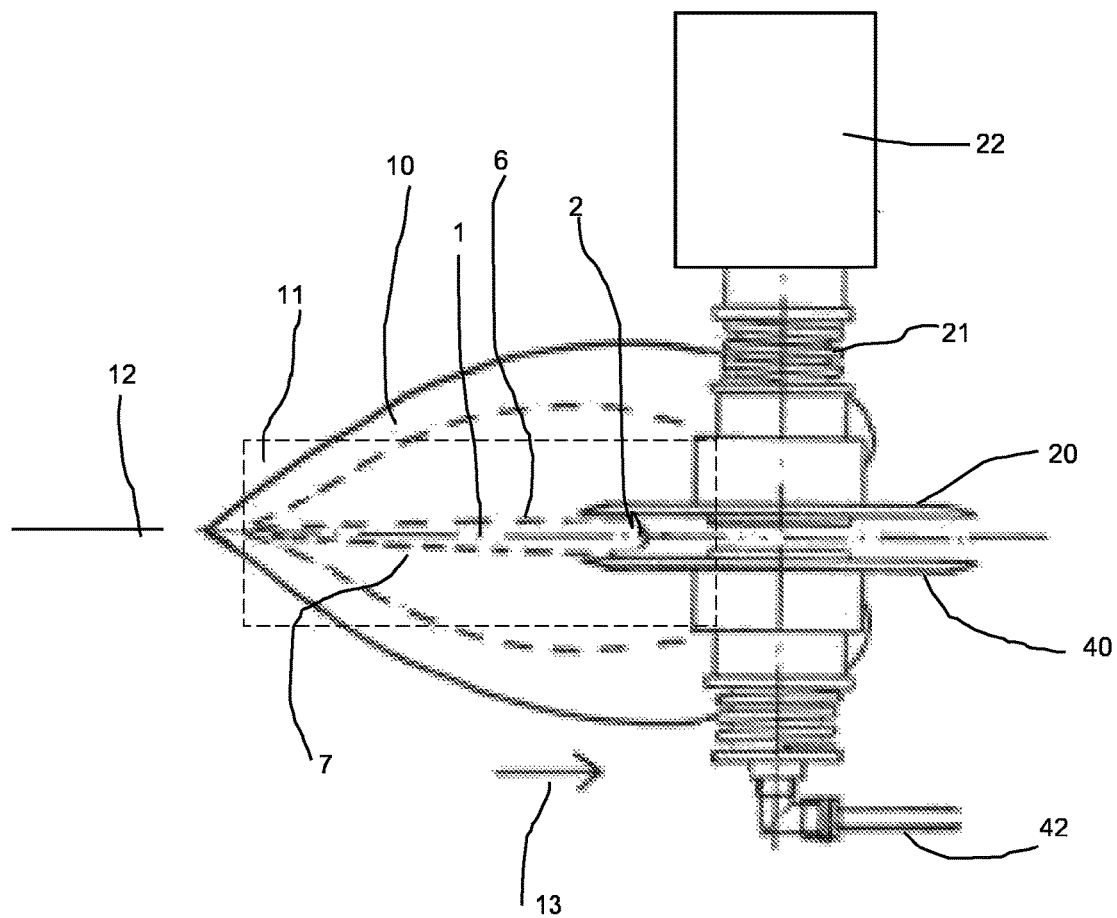
FIG. 4: illustrates schematically a subsequent stage of an embodiment of the method according to FIG. 3, FIG. 5: illustrates schematically a further subsequent stage of an embodiment of the method according to FIG. 3 and FIG. 4, FIG. 6: illustrates schematically a possible embodiment of a first breast meat cutter blade, first blade actuator and first blade support in accordance with the invention.
Figure 5:
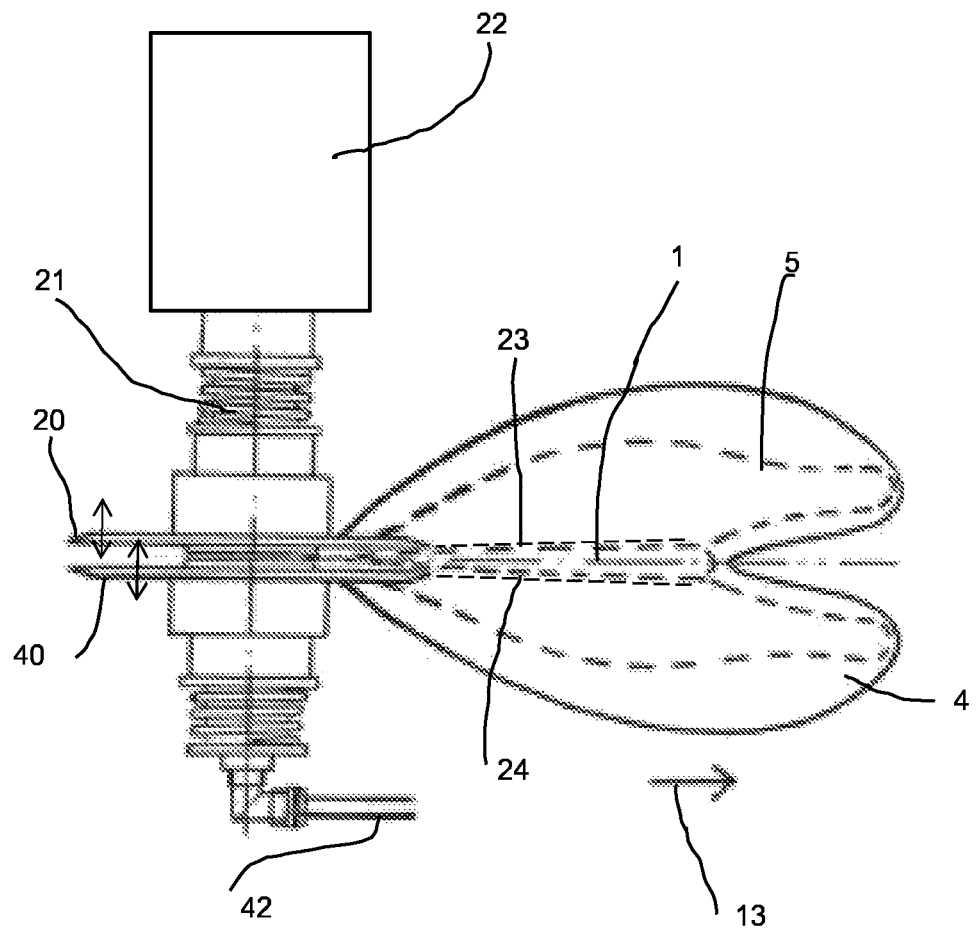

FIG. 4 and FIG. 5 illustrate schematically subsequent stages of an embodiment of the method according to FIG. 3.

FIG. 4 shows that the leading tip 2 of the keel bone 1 passes the first breast meat cutter blade 20 and the second breast meat cutter blade 40 which are in the open position. FIG. 5 shows the situation after the leading tip 2 of the keel bone 1 has passed the first breast meat cutter blade 20 and the second breast meat cutter blade 40, and after the first breast meat cutter blade 20 and the second breast meat cutter blade 40 have been released from the open position, at a point in time when the product carrier 11 has moved the carcass part somewhat further along the conveying path.

When the leading tip 2 of the keel bone 1 has passed the first breast meat cutter blade 20 and the second breast meat cutter blade 40, the first breast meat cutter blade 20 and the second breast meat cutter blade 40 are released from the open position, e.g. by removing the opening force that is applied by the opening assembly and applying the biasing force by the closing assembly, or by increasing the biasing force that is applied by the closing assembly to a level that exceeds the opening force.

The biasing force is directed such that it urges the first and second breast meat cutter blades 20, 40 towards closed position. Due to this, the first breast meat blade 20 is pressed against the first flank 6 of the keel bone 1. Likewise, the biasing force is exerted on the second breast meat cutter blade 40, and the second breast meat blade 40 is pressed against the second flank 7 of the keel bone 1.

Meanwhile, the product carrier 11 is moved along the conveying path 12 past the first breast meat cutter blade 20 and the second breast meat cutter blade 40. The first breast meat cutter blade 20 thereby makes a first incision 23 along the keel bone 1 in the longitudinal direction 3 of the keel bone 1, and the second breast meat cutter blade 40 thereby makes a second incision 24 along the keel bone 1 in the longitudinal direction 3 of the keel bone 1.

Because the first breast meat cutter blade 20 and the second breast meat cutter blade 40 are pressed against the keel bone 1, the incisions 23, 24 made the first breast meat cutter blade 20 and the second breast meat cutter blade 40, respectively, closely follow the shape of the keel bone flanks 6,7. This results in a good yield.

The biasing force biases the first and second breast meat cutter blade 20, 40 towards the closed position, but it is not necessary that the first and second breast meat cutter blades 20, 40 reach the closed position entirely. If the narrowest portion of the keel bone is wider than the distance between the first and second breast meat cutter blades, the first and second breast meat cutter blade 20, 40 do not reach the closed position. Nevertheless, the biasing force is still directed towards the closed position.

After the carcass part 10 on the product carrier has passed the first breast meat cutter blade 20 and the second breast meat cutter blade 40, the first breast meat cutter blade 20 and the second breast meat cutter blade 40 are moved back into the open position, for example by removing the biasing force that is applied by the closing assembly and applying the opening force by the opening assembly, or by increasing the opening force that is applied by the opening assembly to a level that exceeds the biasing force.

The timing as to when the first and second breast meat cutter blades 20, 40 can be released from the open position is for example controlled by a control system that controls the system according to the invention or the production line of which the system according to the invention forms part. As an example, the first and second breast meat cutter blades 20,40 are kept in the open position for a fixed, predetermined time interval which is based on the average or largest size or weight of the flock that is processed and the travelling speed of the product carrier. The start of this time interval may be triggered by the detection of a product carrier or of a reference part of a product carrier at a known point along the conveying path.

Figure 6:
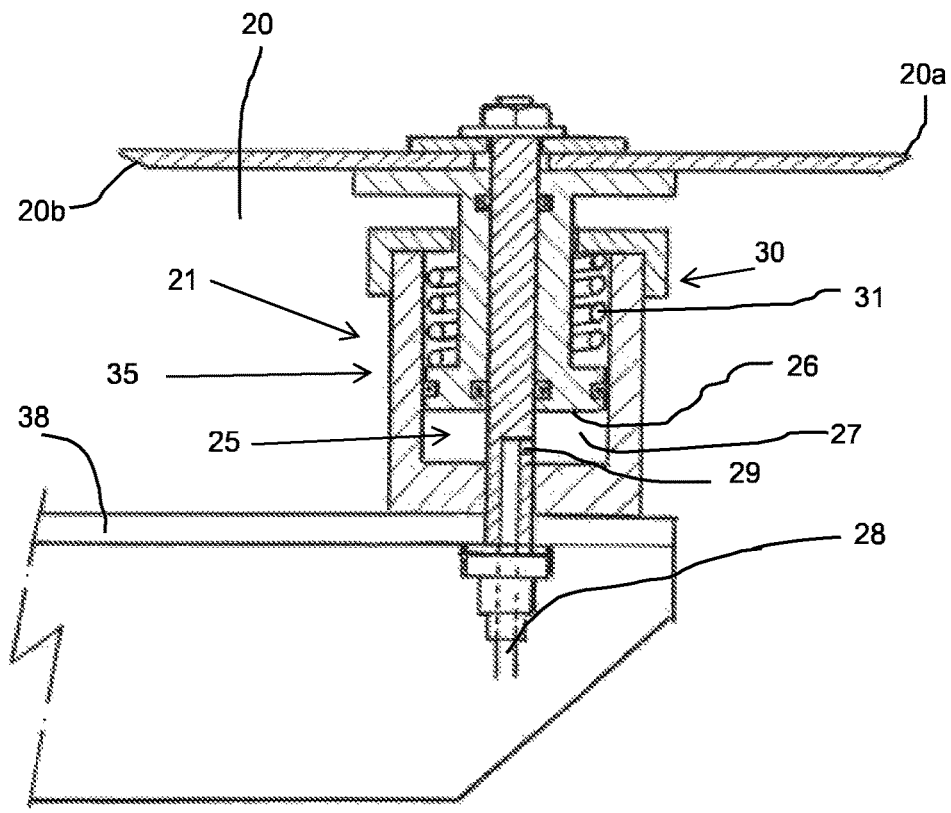

FIG. 6 shows a possible embodiment of a first breast meat cutter blade 20, blade actuator 35 and blade support 21 in accordance with the invention.

In the embodiment shown in FIG. 6, the first breast meat cutter blade 20 is a static blade. In the embodiment of FIG. 6, the system further comprises a frame 38. The first breast meat cutter blade 20 is mounted onto blade support 21, which in this example is arranged between the first breast meat cutter blade 20 and the frame 38.

In the embodiment of FIG. 6, the first breast meat cutter blade 20 is optionally provided with a first facet 20a on the side facing towards the conveying path of the carrier (and therewith in use towards the keel bone) and a second facet 20b on the side facing away from the conveying path of the carrier (and therewith in use away from the keel bone). Optionally, as is shown in FIG. 6, the first facet 20a is smaller than the second facet 20b.

The embodiment of FIG. 6 comprises a blade actuator 35. The blade actuator 35 comprises a closing assembly 25 and an opening assembly 30. The closing assembly 25 is adapted to apply a biasing force to bias the first breast meat cutter blade 20 towards the closed position. The opening assembly 30 is adapted to apply a opening force to hold the first breast meat cutter blade 20 in the open position.

In the embodiment of FIG. 6, the first blade support 21 contains the closing assembly 25 and the opening assembly 30 of the blade actuator 35.

In the exemplary embodiment of FIG. 6, the closing assembly 25 comprises a piston 26 which is actuatable by a fluid medium, which fluid medium is a gas or a liquid. The closing assembly 25 further comprises a fluid chamber 27, and a fluid duct 28. The fluid duct 28 is in fluid communication with a fluid source (not shown). The fluid duct 28 is provided with an aperture 29, which allows the fluid to flow into and out of the fluid chamber 27. The fluid can be a gas of a liquid. Optionally, the fluid is compressed air.

In the embodiment of FIG. 6, the opening assembly 30 comprises a spring 31. The spring 31 is biased towards the opening position, in order to be able to hold the first breast meat cutter blade 20 in the open position.

In use, fluid under pressure is supplied to the fluid chamber 27 when the first breast meat cutting blade 20 has to be released from the open position. This pressurized fluid acts on the piston 26 in order to bias the first breast meat cutter blade 20 towards the closed position against the action of the spring 31 of the opening assembly 30. During the movement of the first breast meat cutter blade 20 from the open position towards the closed position, at some point the first breast meat cutter blade 20 encounters the keel bone 1. The keel bone 1 will prevent further movement of the first breast meat cutter blade 20 towards the distal end of closed position. The pressure of the fluid in the fluid chamber 27 will then still provide a biasing force to the first breast meat cutter blade 20, which biasing force is directed towards closed position. The pressure of the fluid in the fluid chamber will therewith press the first breast meat cutter blade 20 against the keel bone 1, and therewith force the first breast meat cutter blade 20 to follow the shape of the first flank of the keel bone 1.

When the keel bone 1 forces the first breast meat cutter blade 20 to move in the direction of the open position again, for example because a hump is present on the keel bone, or when the trailing end of the keel bone has passed the first breast meat cutter blade 20 and the first breast meat cutter blade has to be returned to the open position, pressurized fluid will flow out of the fluid chamber 27 through the aperture 29 into the fluid duct 28.

By controlling the pressure of the pressurized fluid, the biasing force and therewith the force by which the first breast meat cutter blade 20 is pressed against the keel bone 1 can be controlled.

When the first breast meat cutter blade 20 has to return to the open position, the pressure in the pressurized fluid is relieved to the amount that the spring force exceeds the force on the piston 26. The opening assembly 30 then moves the first breast meat cutter blade 20 towards the open position and holds it in the open position.

Figure 7:
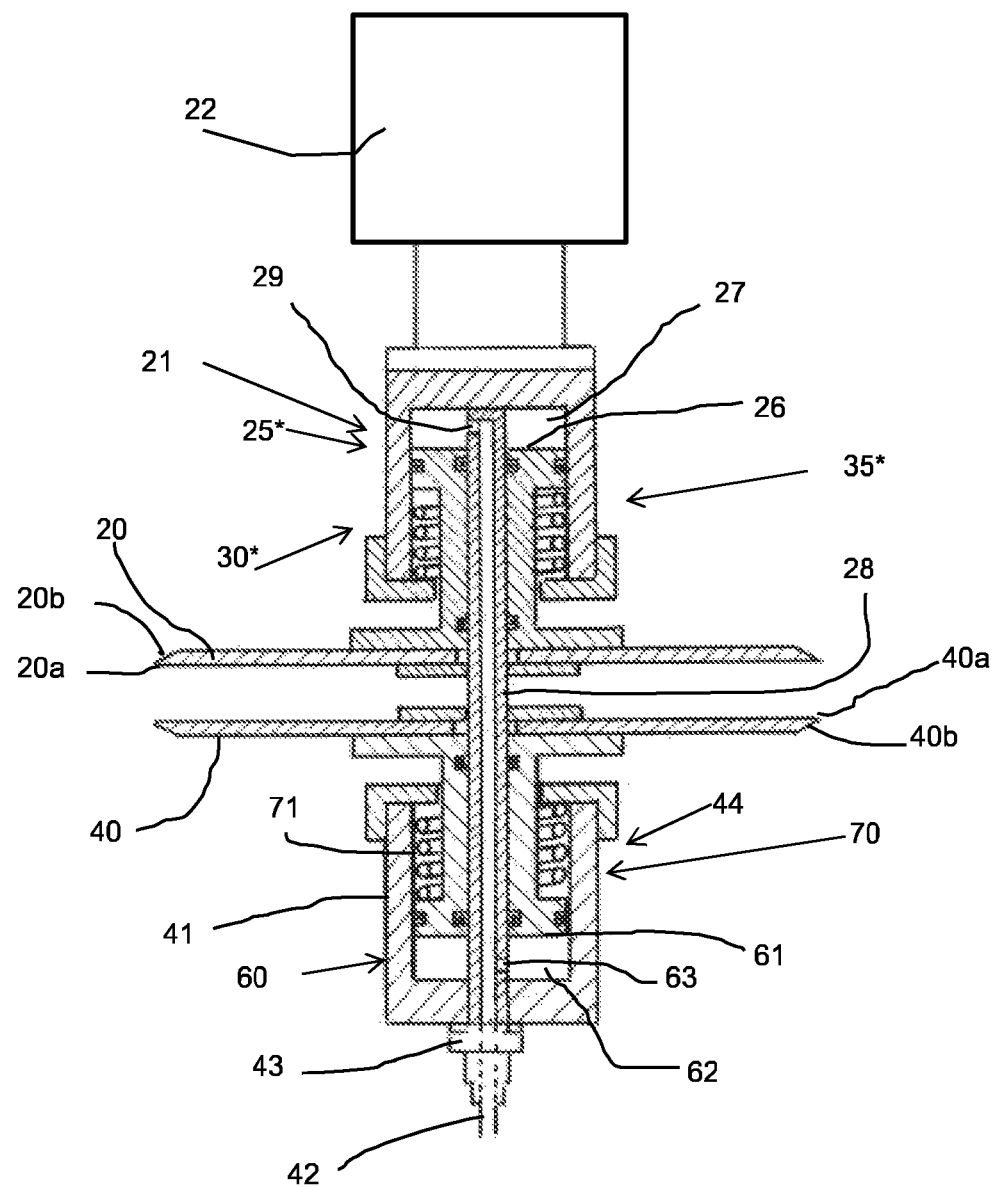
FIG. 7: illustrates schematically a possible embodiment of a system according to the invention in which a first and a second breast meat cutter blade are present.

FIG. 7 shows a possible embodiment of a system according to the invention in which a first and a second breast meat cutter blade are present.

For reasons of clarity, the product carrier is not shown in FIG. 7.

In the embodiment shown in FIG. 7, the first breast meat cutter blade 20 is a rotatable circular blade. In the embodiment of FIG. 6, the system further comprises a first blade drive device 22 which is adapted to rotate the first breast meat cutter blade 20 and the second breast meat cutter blade 40. The first breast meat cutter blade 20 is mounted onto blade support 21, which is partly arranged between the first breast meat cutter blade 20 and the first blade drive device 22. The blade support 21 extends through the first breast meat cutter blade 20 and the second breast meat cutter blade 40, and beyond the second breast meat cutter blade 40.

In the embodiment of FIG. 7, the first breast meat cutter blade 20 is optionally provided with a first facet 20*a* on the side facing towards the conveying path of the product carrier (and therewith in use towards the keel bone) and a second facet 20*b* on the side facing away from the conveying path of the product carrier (and therewith in use away from the keel bone). Optionally, as is shown in FIG. 7, the first facet 20*a* is smaller than the second facet 20*b*.

In the embodiment of FIG. 7, the second breast meat cutter blade 40 is optionally provided with a first facet 40*a* on the side facing towards the conveying path of the product carrier (and therewith in use towards the keel bone) and a second facet 40*b* on the side facing away from the conveying path of the product carrier (and therewith in use away from the keel bone). Optionally, as is shown in FIG. 7, the first facet 40*a* is smaller than the second facet 40*b*.

The embodiment of FIG. 7 comprises a blade actuator 35, 44. The blade actuator comprises a closing assembly which is adapted to apply a biasing force to the first and second breast meat cutter blade to bias the first and second breast meat cutter blade towards the closed position and an opening assembly which is adapted to apply an opening force to the first and second breast meat cutter blade to hold the first and second breast meat cutter blade in the open position.

The blade actuator 35 comprises a first part 35* which is associated with the first breast meat cutter blade 20. The first part 35* of the blade actuator comprises a first part 25* of the closing assembly 25 and the first part 30* of the opening assembly 30. The first part 25* of the closing assembly is adapted to apply a biasing force to the first breast meat cutter blade 20 to bias the first breast meat cutter blade 20 towards the closed position. The first part 30* of the opening assembly is adapted to apply an opening force to the first breast meat cutter blade 20 to hold the first breast meat cutter blade 20 in the open position.

In the embodiment of FIG. 7, the first blade support 21 contains the first part 25* of the closing assembly and the first part 30* of the opening assembly.

The blade actuator comprises a second part 44 which is associated with the second breast meat cutter blade 40. The second part 44 of the blade actuator comprises a second part 60 of the closing assembly and the second part 70 of the opening assembly. The second part 60 of the closing assembly is adapted to apply a biasing force to the second breast meat cutter blade 40 to bias the second breast meat cutter blade 20 towards the closed position. The second part 70 of the opening assembly is adapted to apply an opening force to the second breast meat cutter blade 40 to hold the second breast meat cutter blade 40 in the open position.

In the embodiment of FIG. 7, the extension part 41 of the blade support 21 that extends beyond the second breast meat cutter blade 40 (as seen from the blade drive 22) contains the second part 60 of the closing assembly and the second part 70 of the opening assembly.

In the exemplary embodiment of FIG. 7, first part 25* of the closing assembly comprises a piston 26 which is actuatable by a fluid medium, which fluid medium is a gas or a liquid. The first part 25* of the closing assembly further comprises a fluid chamber 27, and a fluid duct 28. The fluid duct 28 is in fluid communication with a fluid source (not shown) via air supply 42. The fluid duct 28 is provided with an aperture 29, which allows the fluid to flow into and out of the fluid chamber 27. The fluid can be a gas of a liquid. Optionally, the fluid is compressed air.

In the embodiment of FIG. 7, the first part 30* of the opening assembly comprises a spring 31. The spring 31 is biased towards the opening position, in order to be able to hold the first breast meat cutter blade 20 in the open position.

In the exemplary embodiment of FIG. 7, the second part 60 of the closing assembly of the second part 44 of the blade actuator comprises a piston 61 which is actuatable by a fluid medium, which fluid medium is a gas or a liquid. The second part 60 of the closing assembly further comprises a fluid chamber 62, and a fluid duct, which is in this embodiment the fluid duct 28 that is shared with the first part 25* of the closing assembly of the first part 35* of the blade actuator. The fluid duct 28 is in fluid communication with a fluid source (not shown) via air supply 42. The fluid duct 28 is provided with an aperture 63, which allows the fluid to flow into and out of the fluid chamber 62. The fluid can be a gas of a liquid. Optionally, the fluid is compressed air.

A rotary fluid coupling 43 makes that the first blade support 21 can rotate along with the first and second breast meat cutter blades 20, 40 without hampering the supply and discharge of pressurized fluid.

In the embodiment of FIG. 7, the second part 70 of the opening assembly of the second part 44 of the blade actuator comprises a spring 71. The spring 71 is biased towards the opening position, in order to be able to hold the second breast meat cutter blade 40 in the open position.

In use, fluid under pressure is supplied to the fluid chamber 27 when the first breast meat cutting blade 20 has to be released from the open position. This pressurized fluid acts on the piston 26 in order to bias the first breast meat cutter blade 20 towards the closed position against the action of the spring 31 of the opening assembly 30. During the movement of the first breast meat cutter blade 20 from the open position towards the closed position, at some point the first breast meat cutter blade 20 encounters the keel bone 1. The keel bone 1 will prevent further movement of the first breast meat cutter blade 20 towards the closed position. The pressure of the fluid in the fluid chamber 27 will then still provide a biasing force to the first breast meat cutter blade 20, which biasing force is directed towards closed position. The pressure of the fluid in the fluid chamber will therewith press the first breast meat cutter blade 20 against the keel bone 1, and therewith force the first breast meat cutter blade 20 to follow the shape of the first flank of the keel bone 1.

When the keel bone 1 forces the first breast meat cutter blade 20 to move in the direction of the open position again, for example because a hump is present on the keel bone, or when the trailing end of the keel bone has passed the first breast meat cutter blade 20 and the first breast meat cutter blade has to be returned to the open position, pressurized fluid will flow out of the fluid chamber 27 through the aperture 29 into the fluid duct 28.

By controlling the pressure of the pressurized fluid, the biasing force and therewith the force by which the first breast meat cutter blade 20 is pressed against the keel bone 1 can be controlled.

When the first breast meat cutter blade 20 has to return to the open position, the pressure in the pressurized fluid is relieved to the amount that the spring force exceeds the force on the piston 26. The opening assembly 30 then moves the first breast meat cutter blade 20 towards the open position and holds it in the open position.

Likewise, fluid under pressure is supplied to the fluid chamber 62 when the second breast meat cutter blade 40 has to be released from the open position. This pressurized fluid acts on the piston 61 order to bias the second breast meat cutter blade 40 towards the closed position against the action of the spring 71 of the opening assembly 70. During the movement of the second breast meat cutter blade 40 from the open position towards the closed position, at some point the second breast meat cutter blade 40 encounters the keel bone 1. The keel bone 1 will prevent further movement of the second breast meat cutter blade 40 towards the closed position. The pressure of the fluid in the fluid chamber 62 will then provide a biasing force to the second breast meat cutter blade 40, which biasing force is directed towards the closed position. The pressure of the fluid in the fluid chamber will therewith press the second breast meat cutter blade 40 against the keel bone 1, and therewith force the second breast meat cutter blade 40 to follow the shape of the second flank of the keel bone 1.

When the keel bone 1 forces the second breast meat cutter blade 40 to move in the direction of the open position again, for example because a hump is present on the keel bone, or when the trailing end of the keel bone has passed the second breast meat cutter blade 40 and the second breast meat cutter blade 40 has to be returned to the open position, pressurized fluid will flow out of the fluid chamber 62 through the aperture 63 into the fluid duct 28.

By controlling the pressure of the pressurized fluid, the biasing force and therewith the force by which the second breast meat cutter blade 40 is pressed against the keel bone 1 can be controlled.

When the second breast meat cutter blade 40 has to return to the open position, the pressure in the pressurized fluid is relieved to the amount that the spring force of spring 71 exceeds the force on the piston 61. The secondary part 70 of the opening assembly then moves the second breast meat cutter blade 40 towards the open position and holds it in the open position.

Figure 8:
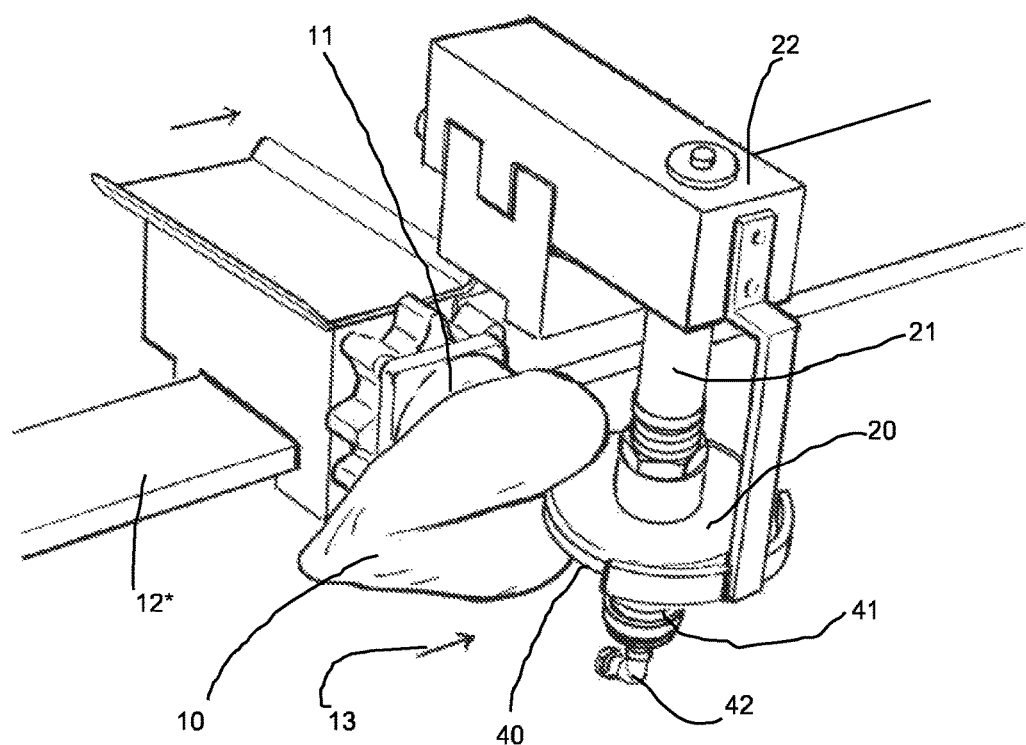
FIG. 8: illustrates schematically a possible embodiment of a system according to the invention in which a first and a second breast meat cutter blade are present.

FIG. 8 shows a possible embodiment of a system according to the invention in which a first and a second breast meat cutter blade 20, 40 are present.

The embodiment shown in FIG. 7 can optionally be combined with the embodiment of FIG. 8.

In the embodiment of FIG. 8, the product carrier 11 supports a carcass part 10, which carcass part comprises a keel bone, breast meat lying against the first flank and breast meat lying against the second flank of the keel bone. In the example of FIG. 8, the carcass part 10 is a breast cap.

The product carrier 11 is moveable in a transport direction 13 along a conveying path. In the exemplary embodiment of FIG. 8, the system comprises a guide 12* which guides the product carriers 11 along the conveying path in the vicinity of the breast meat cutter blades.

In the embodiment of FIG. 8, the first breast meat cutter blade 20 and the second breast meat cutter blade 40 are arranged adjacent to each other on opposite sides of the conveying path of the product carrier 11. The first breast meat cutter blade 20 and the second breast meat cutter blade 40 are both circular blades. The first breast meat cutter blade 20 and the second breast meat cutter blade 40 are arranged coaxially with each other.

In the embodiment of FIG. 8, the first breast meat cutter blade 20 is arranged on a blade support 21 which contains the first part 35* of the blade actuator. The second breast meat cutter blade 40 is arranged on an extension 41 of the blade support 21 which contains the second part 44 of the blade actuator.

A blade drive 22 is present to rotate both the first breast meat cutter blade 20 and the second breast meat cutter blade 40.

An air supply 42 is present to operate the opening assembly and the closing assembly of the blade actuator.

Figure 9:
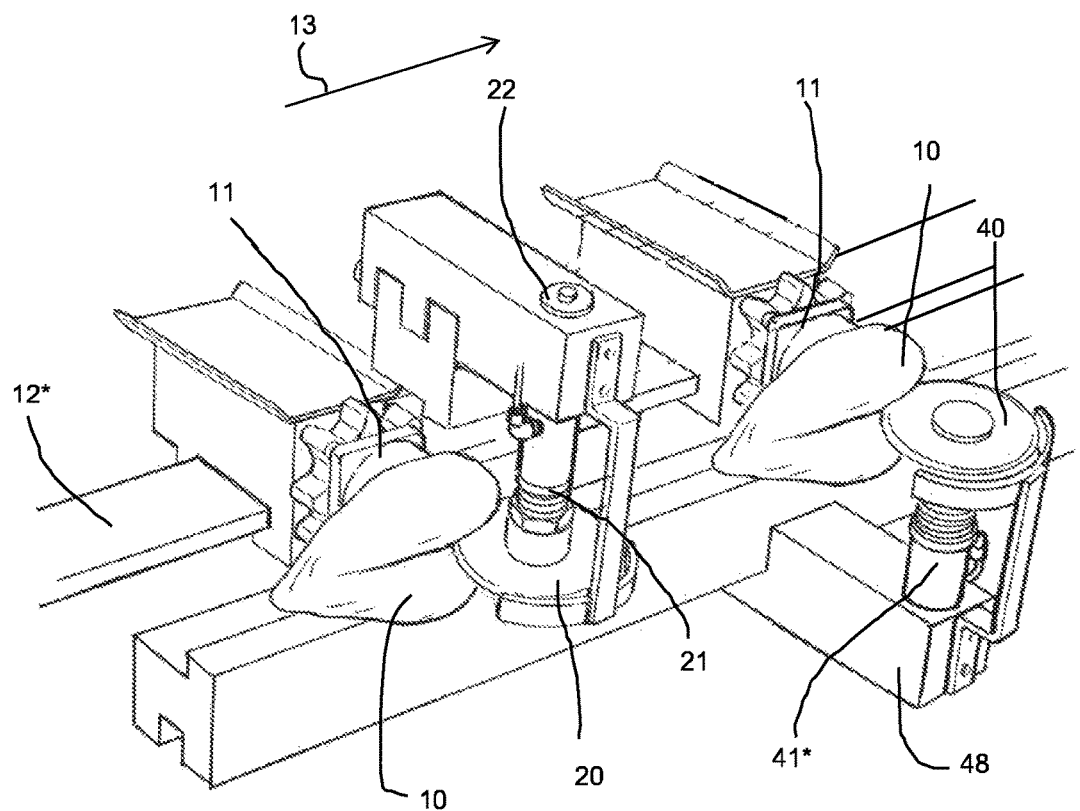
FIG. 9: illustrates schematically a further possible embodiment of a system according to the invention in which a first and a second breast meat cutter blade are present.

FIG. 9 shows a further possible embodiment of a system according to the invention in which a first and a second breast meat cutter blade are present.

In the embodiment of FIG. 9, the product carrier 11 supports a carcass part 10, which carcass part comprises a keel bone, breast meat lying against the first flank and breast meat lying against the second flank of the keel bone. In the example of FIG. 9, the carcass part 10 is a breast cap.

The product carrier 11 is moveable in a transport direction 13 along a conveying path. In the exemplary embodiment of FIG. 9, the system comprises a guide 12\* which guides the product carriers 11 along the conveying path in the vicinity of the breast meat cutter blades.

In the embodiment of FIG. 9, the first breast meat cutter blade 20 and the second breast meat cutter blade 40 are both arranged along the conveying path of the product carrier 11. The second breast meat cutter blade 40 is arranged downstream of the first breast meat cutter blade 20 as seen in the transport direction 13 of the product carrier 11.

In the embodiment of FIG. 9, the first breast meat cutter blade 20 is arranged on a first blade support 21 which contains the first part 35\* of the blade actuator. The second breast meat cutter blade 40 is arranged on a second blade support 41\* which contains the second part 44 of the blade actuator.

A first blade drive device 22 is present to rotate the first breast meat cutter blade 20. A second blade drive 48 is present to rotate the second breast meat cutter blade 40.

The embodiment of FIG. 9 is in particular suitable for carrying out the variant on the method according to the invention in which the first and second incision along the keel bone are made successively instead of simultaneously.

In this method, the carcass part 10 is arranged on product carrier 11. This product carrier 11 is moveable in transport direction 13 along a conveying path.

First breast meat cutter blade 20 is then held in an open position relative to the conveying path by applying an opening force to the first breast meat cutter blade 20. In the open position the distance between the first breast meat cutter blade 20 and the conveying path allows the leading tip of the keel bone to pass the first breast meat cutter blade 20.

The product carrier 11 is then moved further along the conveying path, and the leading tip of the keel bone passes the first breast meat cutter blade 20. Thereby a first incision is made along the leading tip of the keel bone in the longitudinal direction of the keel bone on the side of the first flank of the keel bone.

When the leading tip of the keel bone has passed the first breast meat cutter blade 20, the first breast meat cutter blade 20 is released from the open position, and the first breast meat cutter blade 20 is allowed to move towards the closed position by applying a biasing force on the first breast meat cutter blade 20. The product carrier 11 is moved further along the conveying path 12 such that the keel bone is moved past the first breast meat cutter blade 20, thereby extending the first incision along the first flank of the keel bone towards the trailing tip of the keel bone.

Then, the second breast meat cutter blade 40 is held in an open position relative to the conveying path by applying an opening force to the second breast meat cutter blade 40. In the open position the distance between the second breast meat cutter blade 40 and the conveying path allows the leading tip of the keel bone to pass the second breast meat cutter blade 40.

The product carrier 11 is then moved further along the conveying path and the leading tip of the keel bone is made to pass the second breast meat cutter blade 40, thereby making a second incision along the leading tip of the keel bone in the longitudinal direction of the keel bone on the side of the second flank of the keel bone.

Then, the second breast meat cutter blade 40 is released from the open position, and the second breast meat cutter blade 40 is allowed to move towards the closed position by applying a biasing force on the second breast meat cutter blade 40. The product carrier 11 is moved further along the conveying path such that the keel bone is moved past the second breast meat cutter blade 40, thereby extending the second incision along the second flank of the keel bone towards the trailing tip of the keel bone.

The invention claimed is:

1. A system for separating breast meat from at least a part of a keel bone of a carcass part of slaughtered poultry, the carcass part comprising:
    a keel bone, the keel bone having a longitudinal direction and a first flank and a second flank, the first flank and the second flank extending generally in the longitudinal direction of the keel bone;
    breast meat located against the first flank of the keel bone; and
    breast meat located against the second flank of the keel bone,
    wherein the system comprises:
    a product carrier for supporting the carcass part, the product carrier being moveable in a transport direction along a conveying path;
    a pair of breast meat cutter blades comprising a first breast meat cutter blade and a second breast meat cutter blade, wherein the first breast meat cutter blade is adapted to separate the breast meat from at least a part of the first flank of the keel bone by making an incision along the keel bone in the longitudinal direction of the keel bone, and wherein the second breast meat cutter blade is adapted to separate the breast meat from at least a part of the second flank of the keel bone by making an incision along the keel bone in the longitudinal direction of the keel bone, the product carrier being moveable in the transport direction relative to the breast meat cutter blades, and wherein the first and second breast meat cutter blades are moveable relative to each other between an open position and a closed position, wherein the distance between the first and second breast meat cutter blades in a direction perpendicular to the conveying path of the product carrier in the open position is larger than in the closed position, and wherein the breast meat cutter blades are biased towards the closed position;
    a blade actuator, the blade actuator comprising a closing assembly adapted to apply a biasing force to the first and second breast meat cutter blades to bias the first and second breast meat cutter blades towards the closed position, and an opening assembly adapted to apply an opening force to the first and second breast meat cutter blades to hold the first and second breast meat cutter blades in the open position; and
    a control system, the control system controlling a release of the first and second breast meat cutter blades from the open position when a leading tip of the keel bone has passed the first and second breast meat cutter blades.

2. The system according to claim 1, wherein the opening assembly is adapted to apply the opening force to act against the biasing force of the closing assembly.

3. The system according to claim 1, wherein the system further comprises a blade support onto the first breast meat cutter blade and/or the second breast meat cutter blade is mounted, wherein at least a part of the blade actuator is arranged in the blade support.

4. The system according to claim 3, wherein the first and second breast meat cutter blades are rotatable circular blades, and wherein the system further comprises a blade drive adapted to rotate the first and second breast meat cutter blades, and wherein the blade support, which contains at least a part of the blade actuator, is arranged between the breast meat cutter blade mounted on the blade support and the blade drive.

5. The system according to claim 3, wherein the first breast meat cutter blade and the second breast meat cutter blade are static blades, and wherein the system further comprises a frame, and wherein the blade support, which contains at least a part of the blade actuator, is arranged between the breast meat cutter blade mounted on the blade support and the frame.

6. The system according to claim 1, wherein the opening assembly of the blade actuator comprises a piston actuatable by a fluid medium, the fluid medium being a gas or a liquid, and wherein the closing assembly of the blade actuator comprises a spring.

7. The system according to claim 1, wherein the opening assembly of the blade actuator comprises a spring, and wherein the closing assembly of the blade actuator comprises a piston actuatable by a fluid medium, the fluid medium being a gas or a liquid.

8. The system according to claim 1, wherein both the opening assembly and the closing assembly of the blade actuator comprise a piston actuatable by a fluid medium, the fluid medium being a gas or a liquid.

9. The system according to claim 1, wherein the first breast meat cutter blade and the second breast meat cutter blade are both circular blades, and wherein the first breast meat cutter blade and the second breast meat cutter blade are arranged coaxially with each other.

10. The system according to claim 1, wherein the system comprises a first blade support onto the first breast meat cutter blade is mounted and a second blade support onto the second breast meat cutter blade is mounted, wherein the first blade support comprises:
a first part of the opening assembly of the blade actuator, the first part of the opening assembly being adapted to apply an opening force to the first breast meat cutter blade;
a first part of the closing assembly of the blade actuator, the first part of the closing assembly being adapted to apply an biasing force to the first breast meat cutter blade, and wherein the second blade support comprises:
a second part of the opening assembly of the blade actuator, the second part of the opening assembly being adapted to apply an opening force to the second breast meat cutter blade; and
a second part of the closing assembly of the blade actuator, the second part of the closing assembly being adapted to apply an biasing force to the second breast meat cutter blade.

11. The system according to claim 1, wherein the first breast meat cutter blade and the second breast meat cutter blade are both arranged along the conveying path of the product carrier, and wherein the second breast meat cutter blade is arranged downstream of the first breast meat cutter blade as seen in the transport direction of the product carrier.

12. A method for separating breast meat from at least a part of a keel bone of a carcass part of slaughtered poultry, the method comprising the following steps:

arranging a carcass part on a product carrier, the product carrier being moveable in a transport direction along a conveying path, and the carcass part comprising a keel bone, the keel bone having a longitudinal direction and a first flank and second flank which both extend generally in the longitudinal direction of the keel bone, and breast meat located against the first flank of the keel bone, and breast meat located against the second flank of the keel bone;

holding a first breast meat cutter blade and a second breast meat cutter blade in an open position relative to each other by applying an opening force to the first and second breast meat cutter blades, wherein in the open position the distance between the first breast meat cutter blade and the second breast meat cutter blade in a direction perpendicular to the conveying path allows a leading tip of the keel bone to pass between the first and second breast meat cutter blades;

moving the product carrier along the conveying path and making the leading tip of the keel bone pass between the first and second breast meat cutter blades, thereby making a first incision along the leading tip of the keel bone in the longitudinal direction of the keel bone on the side of the first flank of the keel bone and a second incision along the leading tip of the keel bone in the longitudinal direction of the keel bone on the side of the second flank of the keel bone; and releasing, when the leading tip of the keel bone has passed the first and second breast meat cutter blades, the first and second breast meat cutter blades from the open position, and allowing the first and second breast meat cutter blades to move towards the closed position by applying a biasing force on the first and second breast meat cutter blades and moving the product carrier further along the conveying path such that the keel bone is moved between the first and second breast meat cutter blades, thereby extending the first incision along the first flank of the keel bone towards the trailing tip of the keel bone and extending the second incision along the second flank of the keel bone (1) towards the trailing tip of the keel bone.

13. The method according to claim 12, the method further comprising the following steps:

after the trailing tip of the keel bone has been moved past the first and second breast meat cutter blades, applying the opening force to the first and second breast meat cutter blades to move the first and second breast meat cutter blades into the open position; and continuing to apply the opening force to maintain the first and second breast meat cutter blades in the open position.

14. The method according to claim 12, wherein the opening force and the biasing force are applied simultaneously, and wherein the opening force is larger than the biasing force when the first and second breast meat cutter blades are moved to the open position, and wherein the biasing force is larger than the opening force when the first and second breast meat cutter blades are released from the open position.

15. The method for separating breast meat from at least a part of a keel bone of a carcass part of slaughtered poultry, the method comprising the following steps:

arranging a carcass part on a product carrier, the product carrier being moveable in a transport direction along a conveying path, and the carcass part comprising a keel bone having a longitudinal direction and a first flank and second flank, the first flank and the second flank extending generally in the longitudinal direction of the keel bone, and breast meat located against the first flank of the keel bone, and breast meat located against the second flank of the keel bone;

holding a first breast meat cutter blade in an open position relative to the conveying path by applying an opening force to the first breast meat cutter blade, wherein in the open position the distance between the first breast meat cutter blade and the conveying path allows a leading tip of the keel bone to pass the first breast meat cutter blade;

moving the product carrier along the conveying path and making the leading tip of the keel bone pass the first breast meat cutter blade, thereby making a first incision along the leading tip of the keel bone in the longitudinal direction of the keel bone on the side of the first flank of the keel bone;

releasing, when the leading tip of the keel bone has passed the first breast meat cutter blade, the first breast meat cutter blade from the open position, and allowing the first breast meat cutter blade to move towards the closed position by applying a biasing force on the first breast meat cutter blade and moving the product carrier further along the conveying path such that the keel bone is moved past the first breast meat cutter blade, thereby extending the first incision along the first flank of the keel bone towards the trailing tip of the keel bone;

holding a second breast meat cutter blade in an open position relative to the conveying path by applying an opening force to the second breast meat cutter blade, wherein in the open position the distance between the second breast meat cutter blade and the conveying path allows the leading tip of the keel bone to pass the second breast meat cutter blade;

moving the product carrier along the conveying path and making the leading tip of the keel bone pass the second breast meat cutter blade, thereby making a second incision along the leading tip of the keel bone in the longitudinal direction of the keel bone on the side of the second flank of the keel bone; and releasing, when the leading tip of the keel bone has passed the second breast meat cutter blade, the second breast meat cutter blade from the open position, and allowing the second breast meat cutter blade to move towards the closed position by applying a biasing force on the second breast meat cutter blade and moving the product carrier further along the conveying path such that the keel bone is moved past the second breast meat cutter blade, thereby extending the second incision along the second flank of the keel bone towards the trailing tip of the keel bone.

16. A system for separating breast meat from at least a part of a keel bone of a carcass part of slaughtered poultry, the carcass part comprising:
a keel bone having a longitudinal direction and a first flank extending generally in the longitudinal direction of the keel bone; and
breast meat located against the first flank of the keel bone, the system comprising:
a product carrier for supporting the carcass part, the product carrier being moveable in a transport direction along a conveying path;
a first breast meat cutter blade, wherein the first breast meat cutter blade is adapted to separate the breast meat from at least a part of the first flank of the keel bone by making an incision along the keel bone in the longitudinal direction of the keel bone, and wherein the product carrier is moveable in the direction of transport relative to the breast meat cutter blades, and wherein the first breast meat cutter blade is moveable relative to the conveying path between and open position and a closed position, wherein the distance from the first breast meat cutter blade to the conveying path in a direction perpendicular to the conveying path in the open position is larger than in the closed position, and wherein the first breast meat cutter blade is biased towards the closed position;

a blade actuator, the blade actuator comprising a closing assembly adapted to apply a biasing force to the first breast meat cutter blade to bias the first breast meat cutter blade towards the closed position, and an opening assembly adapted to apply an opening force to the first breast meat cutter blade to hold the first breast meat cutter blade in the open position; and a control system, the control system controlling a release of the first breast meat cutter blade from the open position when a leading tip of the keel bone has passed the breast meat cutter blade.

17. A method for separating breast meat from at least a part of a keel bone of a carcass part of slaughtered poultry, the method comprising the following steps:
arranging a carcass part on a product carrier, the product carrier being moveable in a transport direction along a conveying path, and the carcass part comprising a keel bone having a longitudinal direction and a first flank extending generally in the longitudinal direction of the keel bone, and breast meat located against the first flank of the keel bone;

holding a first breast meat cutter blade in an open position relative to the conveying path by applying an opening force to the first breast meat cutter blade, wherein in the open position the distance between the first breast meat cutter blade and the conveying path allows a leading tip of the keel bone to pass the first breast meat cutter blade;

moving the product carrier along the conveying path and making the leading tip of the keel bone pass the first breast meat cutter blade, thereby making a first incision along the leading tip of the keel bone in the longitudinal direction of the keel bone on the side of the first flank of the keel bone;

releasing the first breast meat cutter blade from the open position, and allowing the first breast meat cutter blade to move towards the closed position by applying a biasing force on the first breast meat cutter blade and moving the product carrier further along the conveying path such that the keel bone is moved past the first breast meat cutter blade, thereby extending the first incision along the first flank of the keel bone towards the trailing tip of the keel bone; and a control system, the control system controlling a release of the first breast meat cutter blade from the open position when the leading tip of the keel bone has passed the first breast meat cutter blade.

18. The system according to claim 2, wherein the system further comprises a blade support onto the first breast meat cutter blade and/or the second breast meat cutter blade is mounted, wherein at least a part of the blade actuator is arranged in the blade support.

19. The system according to claim 2, wherein the opening assembly of the blade actuator comprises a piston actuatable by a fluid medium, the fluid medium being a gas or a liquid, and wherein the closing assembly of the blade actuator comprises a spring.

20. The system according to claim 3, wherein the opening assembly of the blade actuator comprises a piston actuatable by a fluid medium, the fluid medium being a gas or a liquid, and wherein the closing assembly of the blade actuator comprises a spring.

* * * * *